(12) United States Patent
Wakayama et al.

(10) Patent No.: US 7,079,544 B2
(45) Date of Patent: Jul. 18, 2006

(54) APPARATUS AND METHOD FOR INTERWORKING BETWEEN MPLS NETWORK AND NON-MPLS NETWORK

(75) Inventors: Koji Wakayama, Kokubunji (JP); Kenichi Sakamoto, Tokyo (JP); Takeshi Aimoto, Tokyo (JP); Takahisa Miyamoto, Ebina (JP)

(73) Assignee: Hitachi, Ltd., Tokyo (JP)

( * ) Notice: Subject to any disclaimer, the term of this patent is extended or adjusted under 35 U.S.C. 154(b) by 915 days.

(21) Appl. No.: 09/780,413

(22) Filed: Feb. 12, 2001

(65) Prior Publication Data

US 2001/0049739 A1 Dec. 6, 2001

(30) Foreign Application Priority Data

Jun. 2, 2000 (JP) ............................. 2000-170415

(51) Int. Cl.
*H04L 12/56* (2006.01)
(52) U.S. Cl. .................. 370/401; 370/392; 370/395.5; 370/395.51; 370/395.52; 370/395.53; 370/466
(58) Field of Classification Search ............... 370/95.5, 370/395.51, 395.52, 395.53, 395.54, 292, 370/401, 466, 392, 395.5
See application file for complete search history.

(56) References Cited

U.S. PATENT DOCUMENTS 6,339,595 B1 * 1/2002 Rekhter et al. ............. 370/392

6,526,056 B1 * 2/2003 Rekhter et al. ............. 370/392
6,611,532 B1 * 8/2003 Madour et al. ............. 370/401
6,633,571 B1 * 10/2003 Sakamoto et al. .......... 370/401

OTHER PUBLICATIONS

Le Faucheur, F.; IETF Multiprotocol Label Switching (MPLS) Architecture ATM, Jun. 22-24, 1998. ICATM-98., 1998 1st IEEE International Conference on, pp.:6-15.*
Network Working; Loa Anderson; Nortel Networks Inc.; Paul Doolan; Ennovate Networks; Nancy Feldman; IBM Corp; Andre Fredette; Nortel Networks Inc.; Bob Thomas; Cisco Systems, Inc.; Oct. 1999; pp. 1-124.
Network Working Group; J. Moy; Cascade Communications Corp.; Jul. 1997; pp. 1-185.
Network Working Group; David C. Plummer; (DCP@MIT-MC); Nov. 1982; pp. 1-8.
Network Working Group; D. Grossman; Motorola. Inc.;J. Heinanen; Tella; Sep. 1999; pp. 1-21.

* cited by examiner

*Primary Examiner*—Dang Ton
*Assistant Examiner*—Puneet Bhandari

(57) ABSTRACT

In a device that interworks a VLAN network and an MPLS network, a VLAN ID is associated with an MPLS label. In a device that performs interworking from a VLAN network to an MPLS network, an output MPLS label is determined from a pair of a VLAN ID and the information in the layer 3 or layer 4 header of a packet. The output MPLS label is assigned an independent value for each VLAN. In a device that performs interworking from the MPLS network to another VLAN network, the input MPLS label is associated with a VLAN ID.

19 Claims, 17 Drawing Sheets

TCI : TAG CONTROL INFORMATION
CFI : CANONICAL FORMAT INDICATOR
TPID : TAG PROTOCOL IDENTIFIER

FIG. 13

| INPUT VLAN ID (123-1-1) | VLAN (123-1-2) |
|---|---|
| 10 | VLAN #A |
| 20 | VLAN #B |
| ⋮ | ⋮ |

123-1

SEARCH KEY | RESULT

FIG. 14

| | 123-2-1<br>DESTINATION IP ADDRESS | 123-2-2<br>OUTPUT LABEL | 123-2-3<br>OUTPUT PHY. PORT |
|---|---|---|---|
| FOR VLAN #A (123-2-a) | 192.168.10.0 | 100 | 3 |
| | 192.168.20.0 | 101 | 5 |
| | ⋮ | ⋮ | ⋮ |
| FOR VLAN #B (123-2-b) | 192.168.10.0 | 102 | 5 |
| | 192.168.20.0 | 103 | 3 |
| | ⋮ | ⋮ | ⋮ |
| | ⋮ | ⋮ | ⋮ |

← SEARCH KEY → ← RESULT →

| INPUT LABEL (123-3-1) | VLAN (123-3-2) |
|---|---|
| 100 | VLAN #A |
| 101 | VLAN #A |
| 102 | VLAN #B |
| ⋮ | ⋮ |

123-3

SEARCH KEY | RESULT

FIG. 16

| | 123-4-1 | 123-4-2 | 123-4-3 | 123-4-4 |
|---|---|---|---|---|
| 123-4 | DESTINATION IP ADDRESS | MAC ADDRESS | OUTPUT VLAN ID | OUTPUT PHY. PORT |
| VLAN #A | 192.168.10.0 | aa.bb.cc. dd.ee.ff | 10 (VLAN #A) | 8 |
| | 192.168.20.0 | 11.22.33. 44.55.66 | 10 (VLAN #A) | 9 |
| 123-4-a | ⋮ | ⋮ | ⋮ | ⋮ |
| VLAN #B | 192.168.10.0 | aa.bb.cc. dd.ee.ff | 20 (VLAN #B) | 9 |
| | 192.168.20.0 | 11.22.33. 44.55.66 | 20 (VLAN #B) | 8 |
| 123-4-b | ⋮ | ⋮ | ⋮ | ⋮ |
| | ⋮ | ⋮ | ⋮ | ⋮ |

← SEARCH KEY → ← RESULT →

APPARATUS AND METHOD FOR INTERWORKING BETWEEN MPLS NETWORK AND NON-MPLS NETWORK

BACKGROUND OF THE INVENTION

1. Field of the Invention

The present invention relates to packet communication devices, especially devices that interwork virtual private networks (VPNs).

2. Description of Related Art

One of the means of building an intranet in a company is a virtual local area network (VLAN). The IEEE 802 committee of the United States has standardized the VLAN method as IEEE 802.1Q.

FIG. 2 shows the VLAN packet format as defined in IEEE 802.1Q. In a VLAN 15 as defined by IEEE 802.1Q, an IP (Internet Protocol) packet 500 is transmitted as an Ethernet frame 510, in which tag control information 514 is specified. User priority 514-1, Conical Format Indicator (CFI) 514-2 and a 12-bit VLAN ID 5-14-3 is set in the tag control information 514. The VLAN ID is the identifier of the group that configures the VLAN. A 3-bit user priority 514-1 indicates the packet priority. The IP packet 500 also includes destination MAC address 511, source MAC address 512, Tag Protocol Identifier (TPID) 513, Internet Protocol (IP) header 501, IP Payload 502 and Frame Check Sequence (FCS) 515.

FIG. 3 shows a configuration example of a VLAN network. In FIG. 3, the network physically extends across two locations 6-1 and 6-2, like the first floor and second floor of a building. Location 6-1 contains two networks, VLAN #A (7-1-1) and VLAN #B (7-2-1). Location 6-2 also contains two networks, VLAN #A (7-1-2) and VLAN #B (7-2-2). VLAN #A (7-1-1) and VLAN #B (7-2-1) are multiplexed by a switching hub 2-1. Similarly, VLAN #A (7-1-2) and VLAN #B (7-2-2) are multiplexed by a switching hub 2-2. VLAN #A and VLAN #B are each assigned a unique VLAN ID. The switching hubs 2-1 and 2-2 identify the VLAN to which a packet belongs, by looking at the VLAN ID. For example, packets that VLAN #A7-1-1 transmits to location 6-2 are transferred only to VLAN #A7-1-2 by the switching hub 2—2.

On the other hand, one of the packet transfer technologies used in the Internet is multiprotocol label switching (MPLS). With MPLS, the packet transfer devices in a network perform packet transfer processing by using fixed-length connection identifiers called labels.

FIG. 7 shows a configuration example of an MPLS network. The transfer of a packet from terminal 4-A to terminal 4-C is explained. Terminals 4-B and 4-D are also shown as being part of the network, however no transfers to them are shown. From the destination IP address that is set in the packet, device 3-1, which is the ingress node of the MPLS network, determines the output destination of the packet and the label value to be specified in the packet. Device 3-2, which relays the packet, determines the output destination of the packet and the label value to be specified in the output packet, by using the label that was specified in the input packet. Device 3—3, which is the egress node of the MPLS network, removes the label from the packet, looks at the IP header that was set in the packet, and determines the the next hop of the packet. Regarding the MPLS protocol, the Internet Engineering Task Force (IETF) is working on its standardization.

FIG. 4 shows the MPLS packet format when the Point-to-Point Protocol (PPP) 20 is used as the lower layer. In PPP-based MPLS, a four-byte shim header 522 is inserted between the PPP header 521 and the IP header 501. The shim header has a 20-bit label 521-1, a 3-bit Exp (Experimental) field 521-2, a 1-bit S bit 521-3, and an 8-bit Time to Live (TTL) field. The IETF is studying whether the Exp field 521-2 should be used as a Quality of Service (QoS) class. The MPLS packet format also includes an IP Payload 502 and a FCS 523.

FIG. 5 shows the MPLS packet format when the Asynchronous Transfer Mode (ATM) is used as the lower layer. A padding 535-1 and a trailer 535-2 are added to the IP packet 500 to form the AAL5 frame 535 (null encapsulation defined according to RFC2684 of IETF). The AAL5 frame 535 is divided into 48-byte sections, and the individual sections are each given a cell header 531 and payload 532 and become ATM cells 530-1 to 530-n.

FIG. 6 shows the ATM cell format. In ATM-based MPLS, the set values for the virtual path identifier (VPI) 531-2 and virtual channel identifier (VCI) 531-3 in the cell header 531 are used as the label. Also, the one-bit cell loss priority (CLP) bit 531-5 10 indicates the cell discard priority. The ATM cell format also includes a Generic Flow Control (GFC) 531-1, Payload Time Identifier (PTI) 531-4 and Header Error Code (HEC) 531-6.

Hereinafter, either the shim header or the ATM cell header in which the label value is set is called the MPLS header.

In the past, communication between physically separated offices in the same company was generally carried out through leased lines. In recent years, however, the number of users who connect offices by building virtual private networks (VPNs) that use the Internet is increasing.

When VLANs located in physically separated places are connected through an MPLS network, the device positioned at the ingress node of the MPLS network deletes the tag control information. Consequently, the information (VLAN ID) that indicates the VLAN to which the packet belongs is lost from the packet to be transferred.

Accordingly, there is a problem in which the device positioned at the egress node of the MPLS network cannot set a VLAN ID for the packet to be output.

Furthermore, because the tag control information is deleted from the packet, the priority information (user priority) of the packet is lost. Consequently, there is a problem in which the VLAN on the side that receives the packet cannot perform the same QoS control as the VLAN on the side that sends the packet.

SUMMARY OF THE INVENTION

In short, in the past, mapping the information written in the header of the layer corresponding to layer 2 of the OSI model to the MPLS header had not been studied.

Accordingly, the object of the present invention is to allow mapping of information written in the header of the layer corresponding to layer 2 of the OSI model to the MPLS header.

The object of the present invention is to connect VLANs located at physically separated places and belong to the same group by using an MPLS network, while maintaining the isolation of each VLAN.

Also, another object of the present invention is to carry out consistent QoS control at each end, even when VLAN networks are interworked by an MPLS network.

In the present invention, the header transformation information that shows the correspondence between a pair of the information in the header, which is different from the MPLS header and is added before the header, which is the packet header used in networks in which the MPLS protocol is not used, of the layer that corresponds to layer 3 of the OSI model (hereinafter referred to as "layer 3 header"), of the layer that corresponds to layer 2 of the OSI model (hereinafter referred to as "layer 2 header"), and the information in said layer 3 header; and the information in said MPLS header, is set in packet transfer devices that interwork an MPLS network and networks that do not use the MPLS protocol. The packet transfer devices transform said layer 2 header to the MPLS header by using this information.

Also, the header transformation information that indicates the correspondence between a pair of said MPLS header information and said layer 3 header information, and said layer 2 header information is set in the packet transfer devices.

The packet transfer devices transform the MPLS header to said layer 2 header by using this information.

In a preferred embodiment of the present invention, a VLAN ID and an MPLS label are associated in the devices that interwork VLAN and MPLS. The devices that perform interworking from the VLAN networks to the MPLS network determine an output MPLS label from a pair of a VLAN ID and packet header information. The output MPLS label is assigned an independent value for each VLAN. The devices that perform interworking from the MPLS network to the VLAN networks associate an input MPLS label to a VLAN ID.

In another preferred embodiment of the present invention, the devices that interwork VLAN and MPLS associate the 3-bit user priority in the tag control information to the field that sets a QoS value of the MPLS header. For PPP-based MPLS, the 3-bit user priority is mapped to the 3-bit Exp field in the shim header. For ATM-based MPLS, the 3-bit user priority is transformed to a 1-bit CLP bit in the cell header.

BRIEF DESCRIPTION OF THE DRAWINGS

FIG. 13 is a diagram that shows a configuration example of the VLAN ID search table that is provided in network interworking devices of the present invention.

FIG. 14 is a diagram that shows a configuration example of the route search table for an MPLS output that is provided in network interworking devices of the present invention.

FIG. 15 is a diagram that shows a configuration example of the MPLS label search table that is provided in network interworking devices of the present invention.

FIG. 16 is a diagram that shows a configuration example of the route search table for a VLAN output that is provided in network interworking devices of the present invention.

DESCRIPTION OF THE PREFERRED EMBODIMENTS

Below, the preferred embodiments of the present invention will be described by using drawings.

Figure 1:
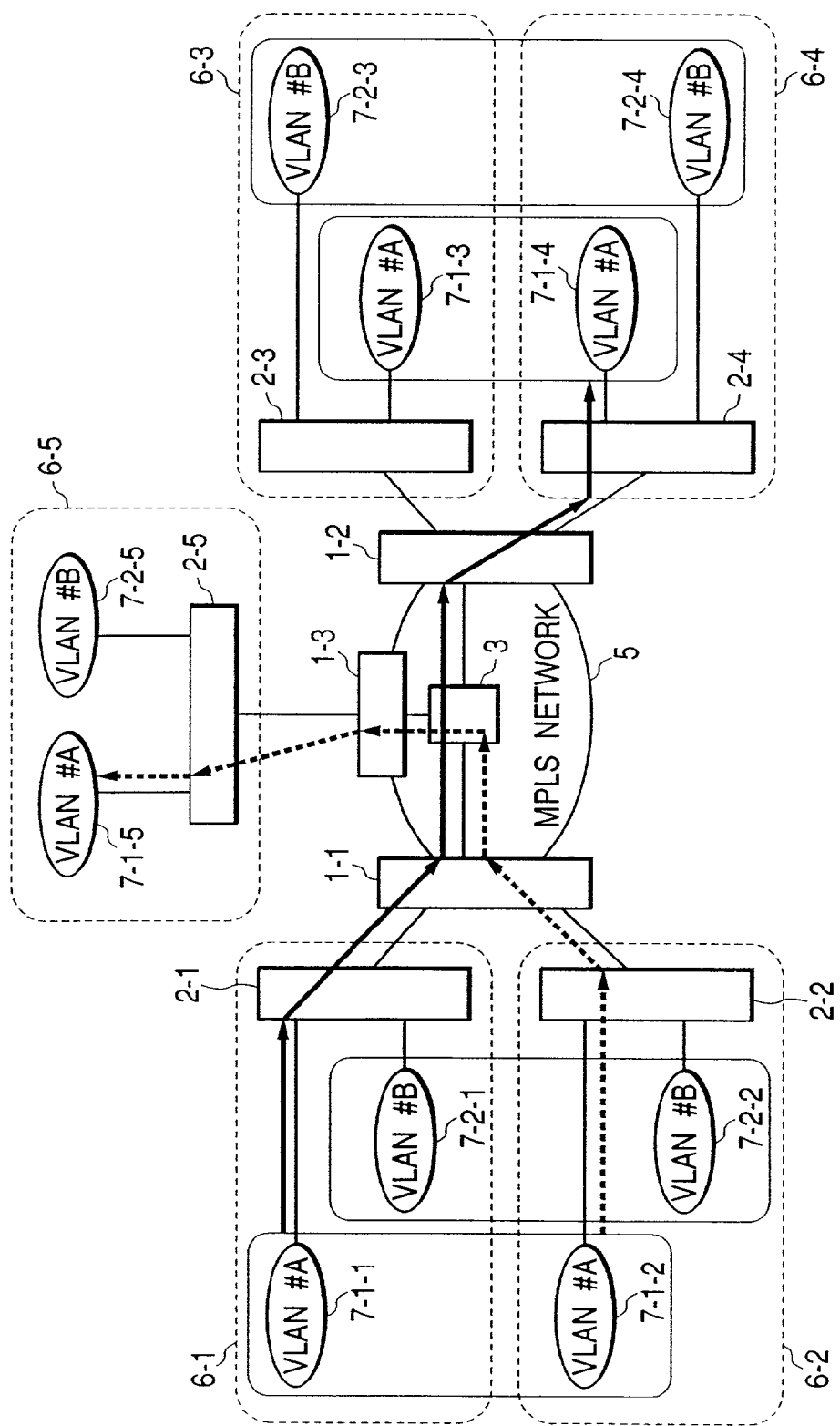
FIG. 1 is a diagram that shows a configuration example of a network that is configured using network interworking devices of the present invention.
Figure 2:
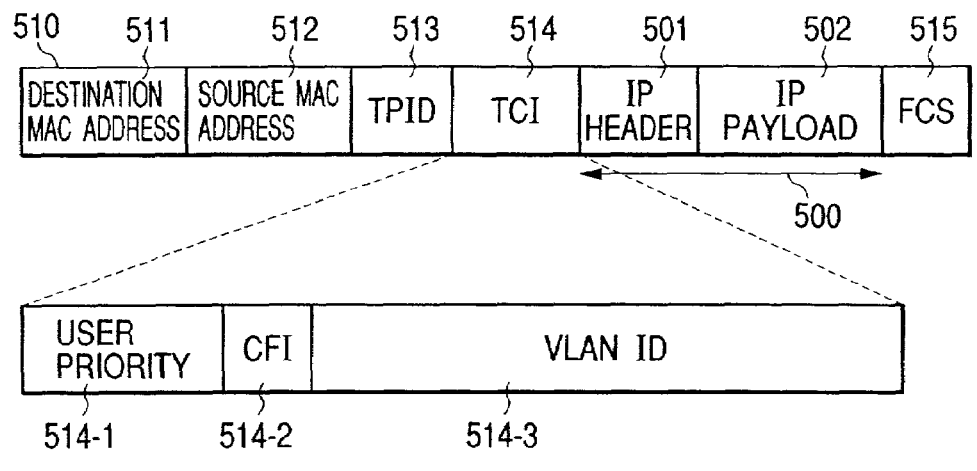
FIG. 2 is a diagram that shows the VLAN packet format specified by IEEE 802.1Q.
Figure 3:
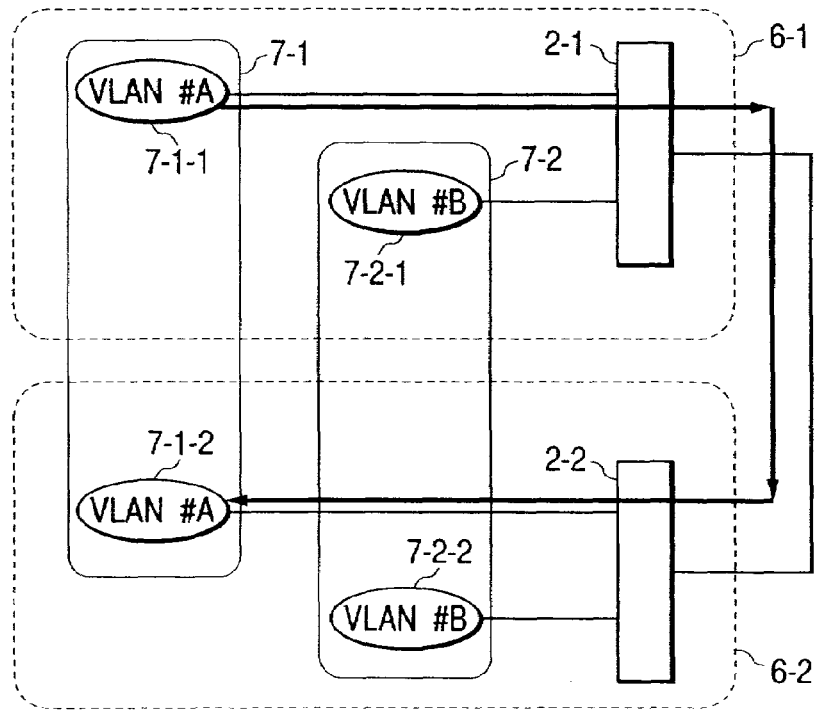
FIG. 3 is a diagram that shows a configuration example of a VLAN network.
Figure 4:
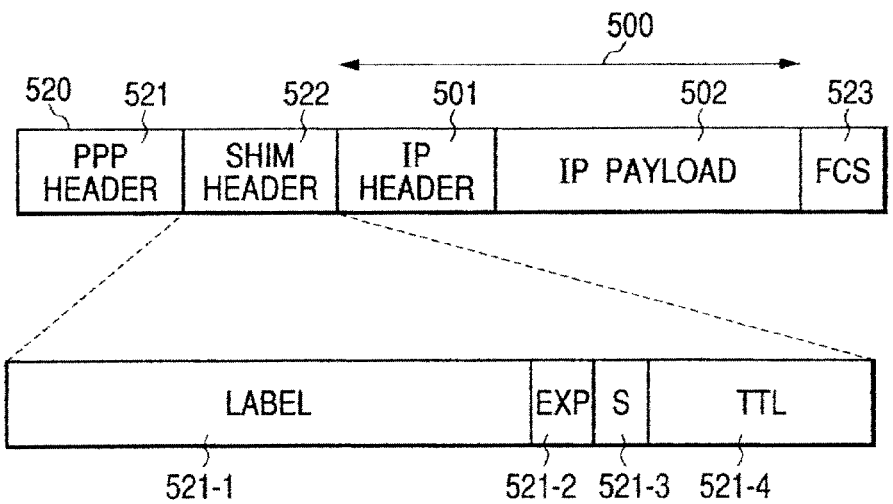
FIG. 4 is a diagram that shows the frame format of PPP-based MPLS.
Figure 5:
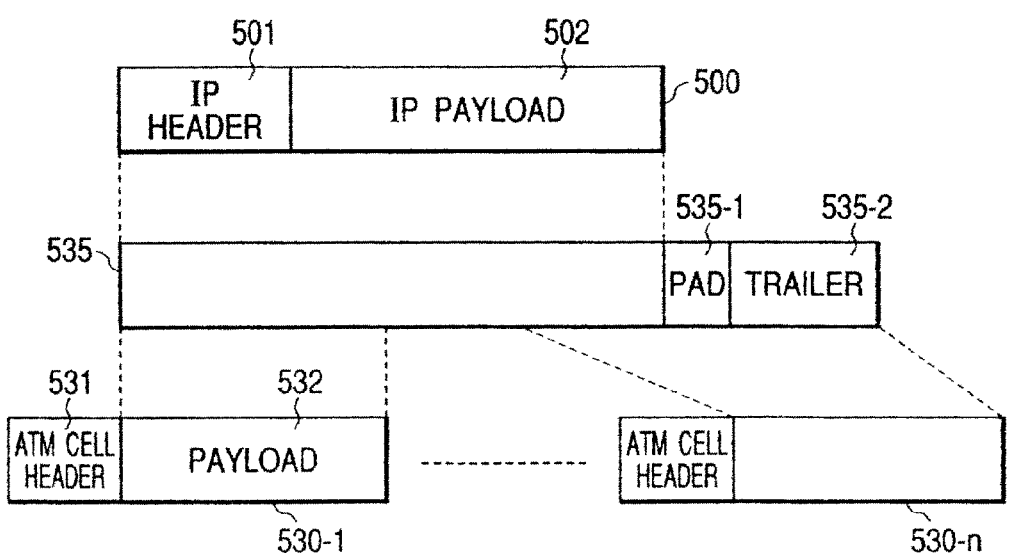
FIG. 5 is a diagram that shows the frame format of ATM-based MPLS.
Figure 6:
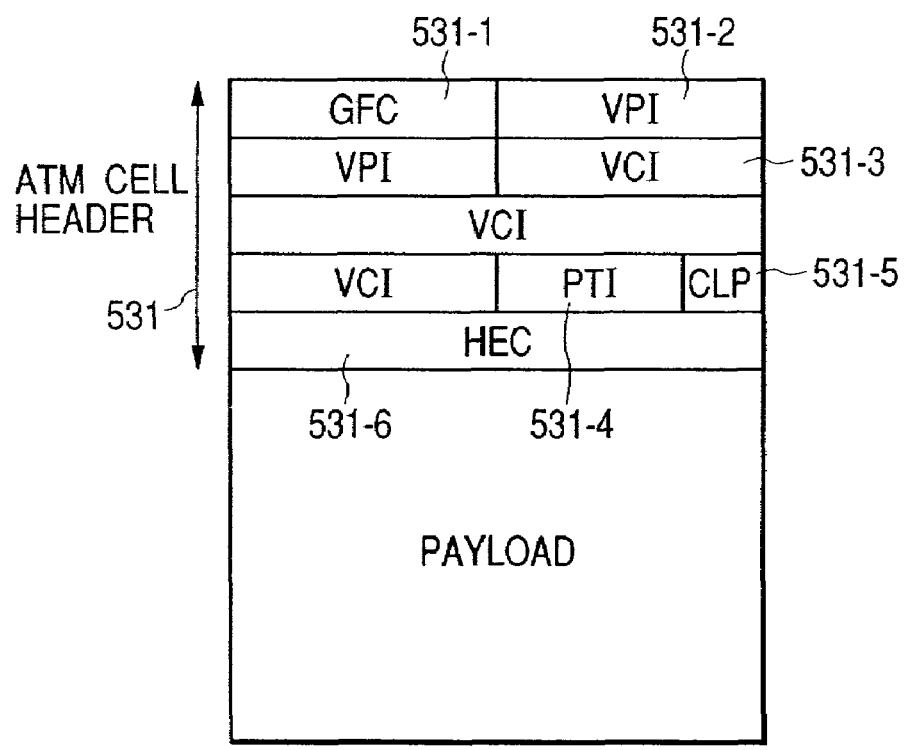
FIG. 6 is a diagram that shows the cell format of ATM.
Figure 7:
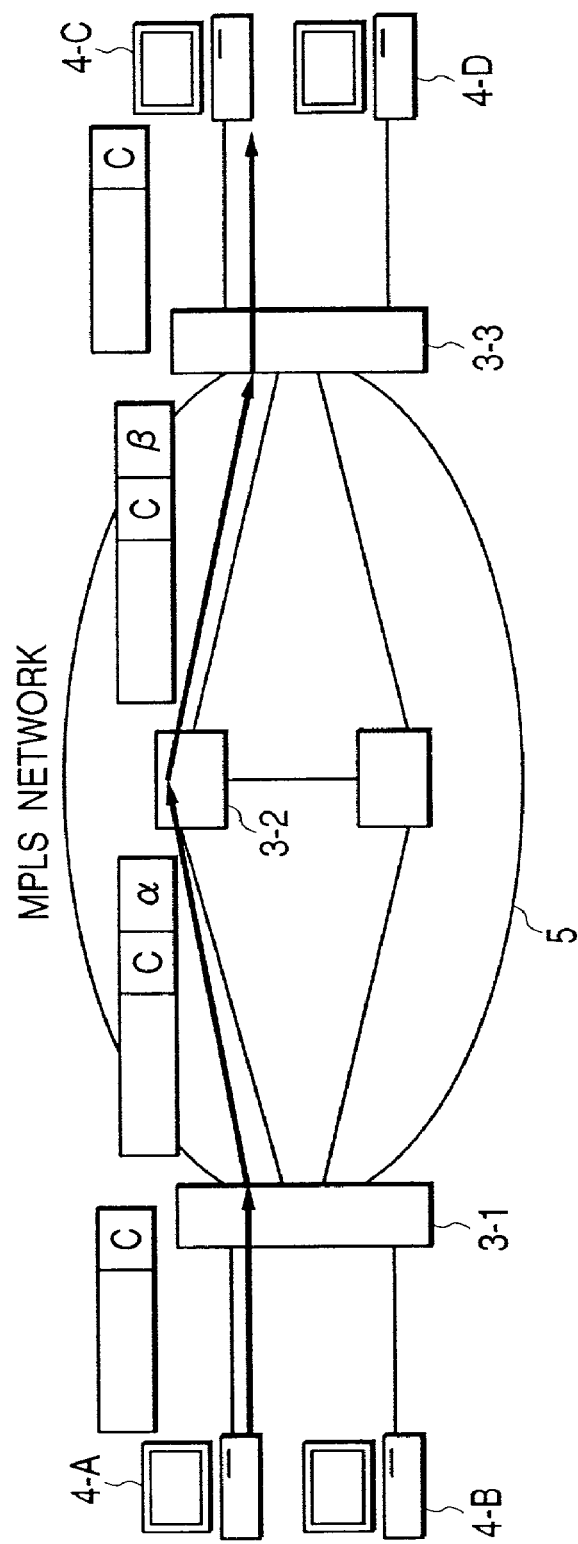
FIG. 7 is a diagram that shows a configuration example of an MPLS network.

FIG. 1 shows a configuration example of a network to which the present invention is applied. VLAN #A comprises networks 7-1-1, 7-1-2, 7-1-3, 7-1-4 and 7-1-5.

VLAN #B comprises networks 7-2-1, 7-2-2, 7-2-3, 7-2-4 and 7-2-5. Locations 6-1, 6-2, 6-3, 6-4 and 6-5 are mutually connected by an MPLS network 5. The MPLS network 5 comprises network interworking devices 1—1, 1-2 and 1-3, and packet relay device 3.

Below, an example of packet transfer from VLAN #A 7-1-1 to VLAN #A 7-1-4, via network interworking devices 1—1 and 1-2 is described.

Figure 8:
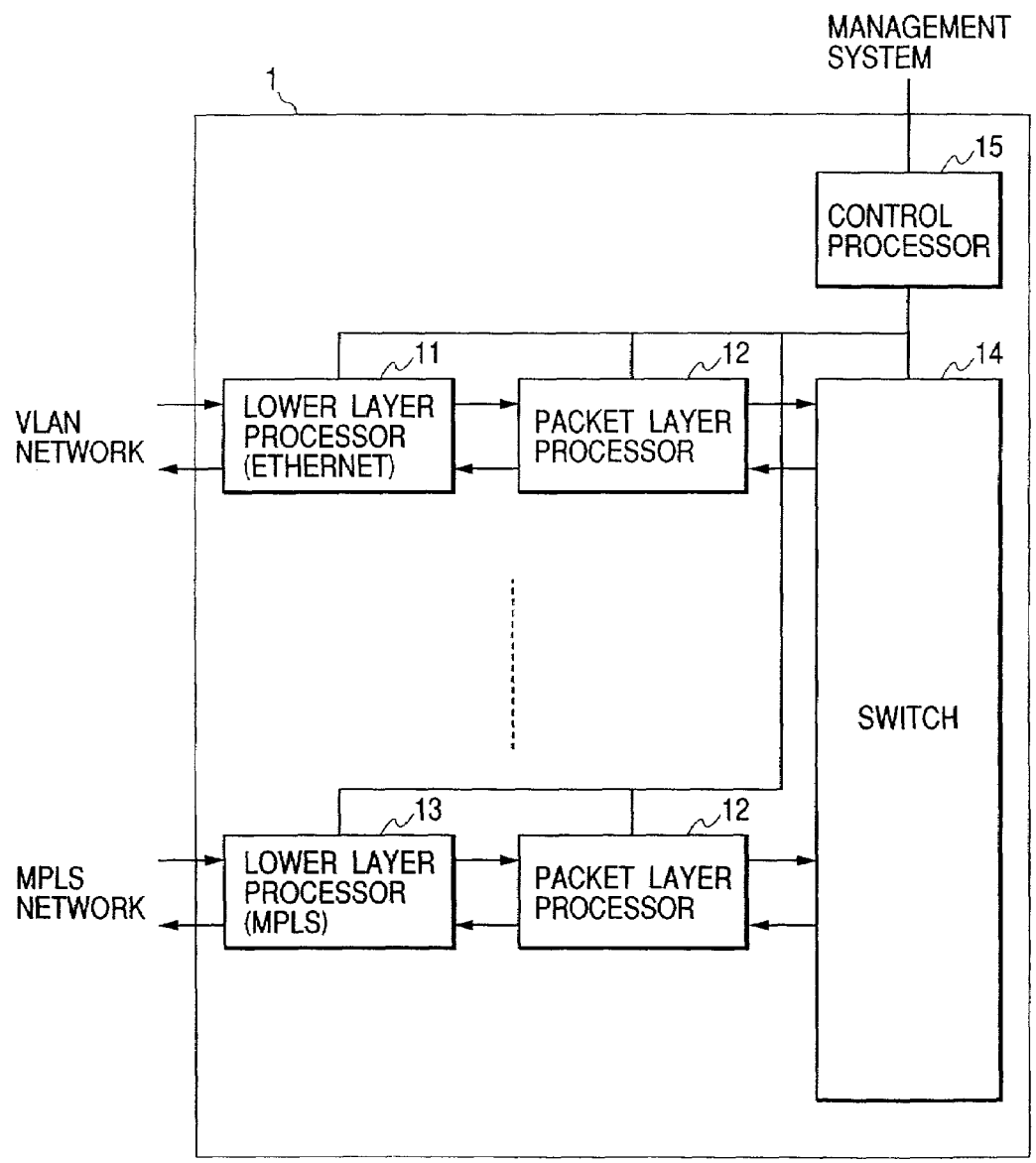
FIG. 8 is a diagram that shows a configuration example of network interworking devices of the present invention.

FIG. 8 shows a configuration example of network interworking devices 1—1, 1-2 and 1-3 of the present invention. The network interworking devices have a lower layer processor for Ethernet 11, a packet layer processor 12, an lower layer processor for MPLS 13, a switch 14 and a control processor 15.

When the lower layer processor for Ethernet 11 receives an Ethernet frame, it performs termination processing of the physical and data link layers of that frame and passes the IP packet and tag control information to the packet layer processor 12. The lower layer processor for Ethernet 11 also adds the destination MAC address and tag control information that were determined by the packet layer processor 12 to the IP packet, changes the IP packet to an Ethernet frame, and sends it to the VLAN network.

When the lower layer processor for MPLS 13 receives an MPLS packet, it performs termination processing of the physical layer and MPLS header of that packet and passes the IP packet and MPLS header information to the packet layer processor 12. Also, the MPLS header information that was determined by the packet layer processor 12 is added to the IP packet, and the IP packet is changed to an MPLS packet and sent to the MPLS network.

The packet layer processor 12 determines the next hop of the packet based on the IP header information and tag control information of the input packet, or the MPLS header information.

The switch 14 transmits the packet that was output from a packet layer processor 12, to the other packet layer processor 12 that corresponds to the next hop of the packet specified by the first packet layer processor 12.

The control processor 15 is connected with the management system and controls all the processors in network interworking device 1.

Figure 9:
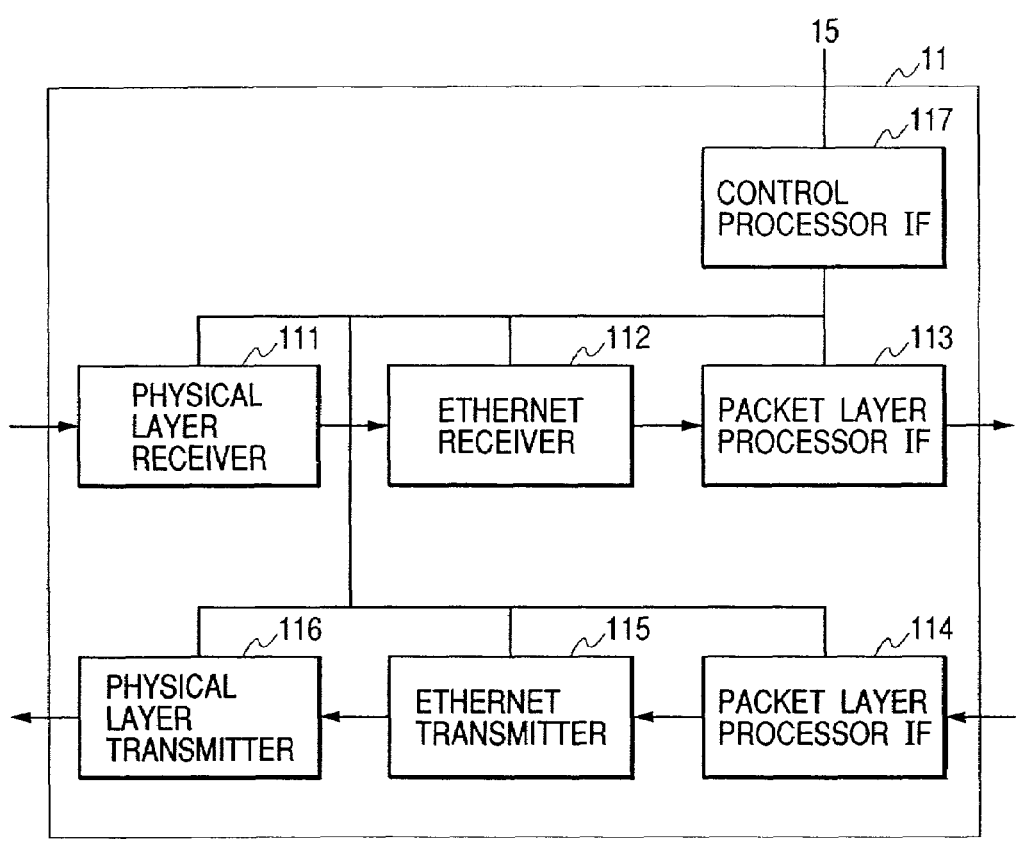
FIG. 9 is a diagram that shows a configuration example of the lower layer processor in network interworking devices of the present invention.

FIG. 9 shows the configuration of the lower layer processor for Ethernet 11 that is located in the circuit on the VLAN side.

The physical layer receiver 111 performs physical layer processing of a received Ethernet frame. The Ethernet receiver 112 performs termination processing of a received Ethernet frame. Namely, based on the destination MAC address of a received frame, all the frames addressed to locations other than itself are discarded and also processing of extracting the tag control information of a received frame addressed to itself is performed. The packet layer processor interfaces 113 and 114 are the interfaces with the packet layer processor 12. The Ethernet transmitter 115 performs processing such as adding MAC addresses and tag control information to transform an IP packet to an Ethernet frame. The physical layer transmitter 116 performs processing of transmitting an Ethernet frame through the physical circuit. The control processor interface 117 is the interface with the control processor 15 and connects with all the configuration elements of the lower layer processor 11.

Figure 10:
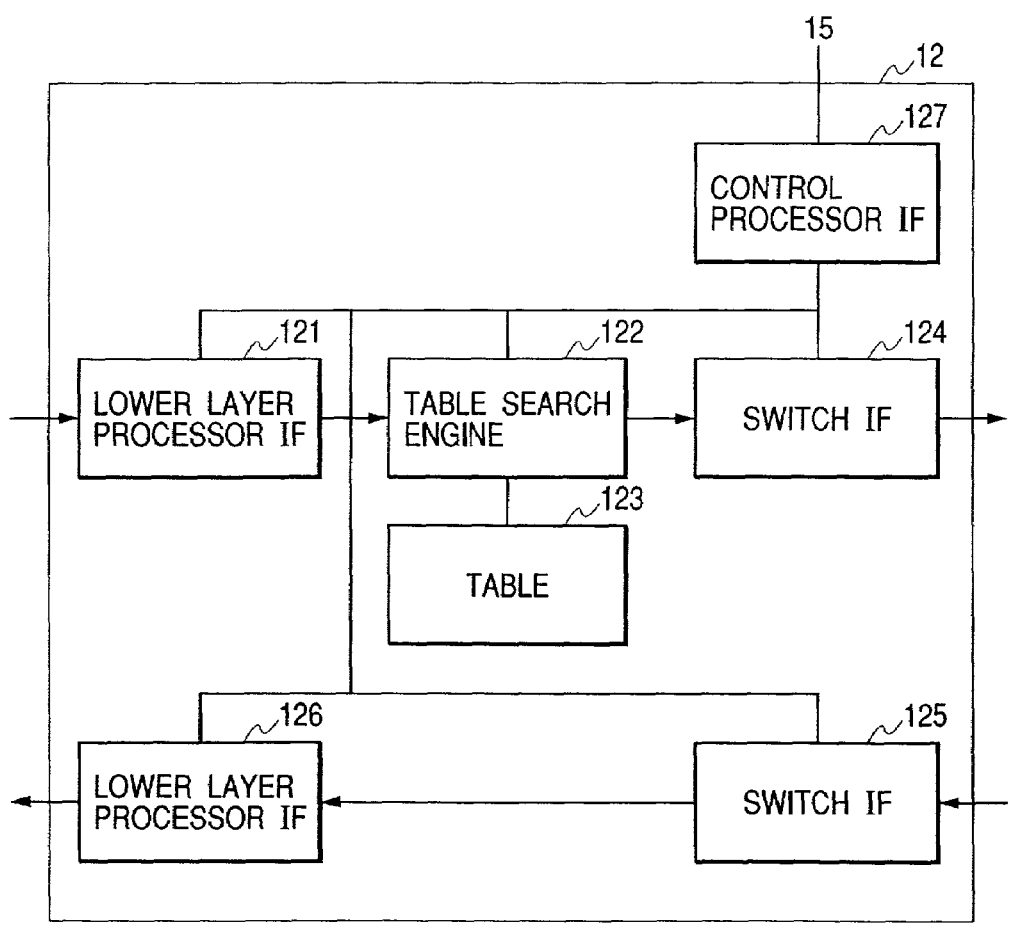
FIG. 10 is a diagram that shows a configuration example of the packet layer processor in network interworking devices of the present invention.

FIG. 10 shows the configuration of the packet layer processor 12. The lower layer processor interfaces 121 and 126 are the interfaces with the lower layer processor for Ethernet 11 and the lower layer processor for MPLS, respectively. The table search engine 122 searches the tables 123 and performs processing of obtaining an output physical port and VLAN ID, or an MPLS label to be added to an output packet. The switch interfaces 124 and 125 are the interfaces with the switch 14. The control processor interface 127 is the interface with the control processor 15 and connects with all the configuration elements of the packet processor 12.

Figure 12:
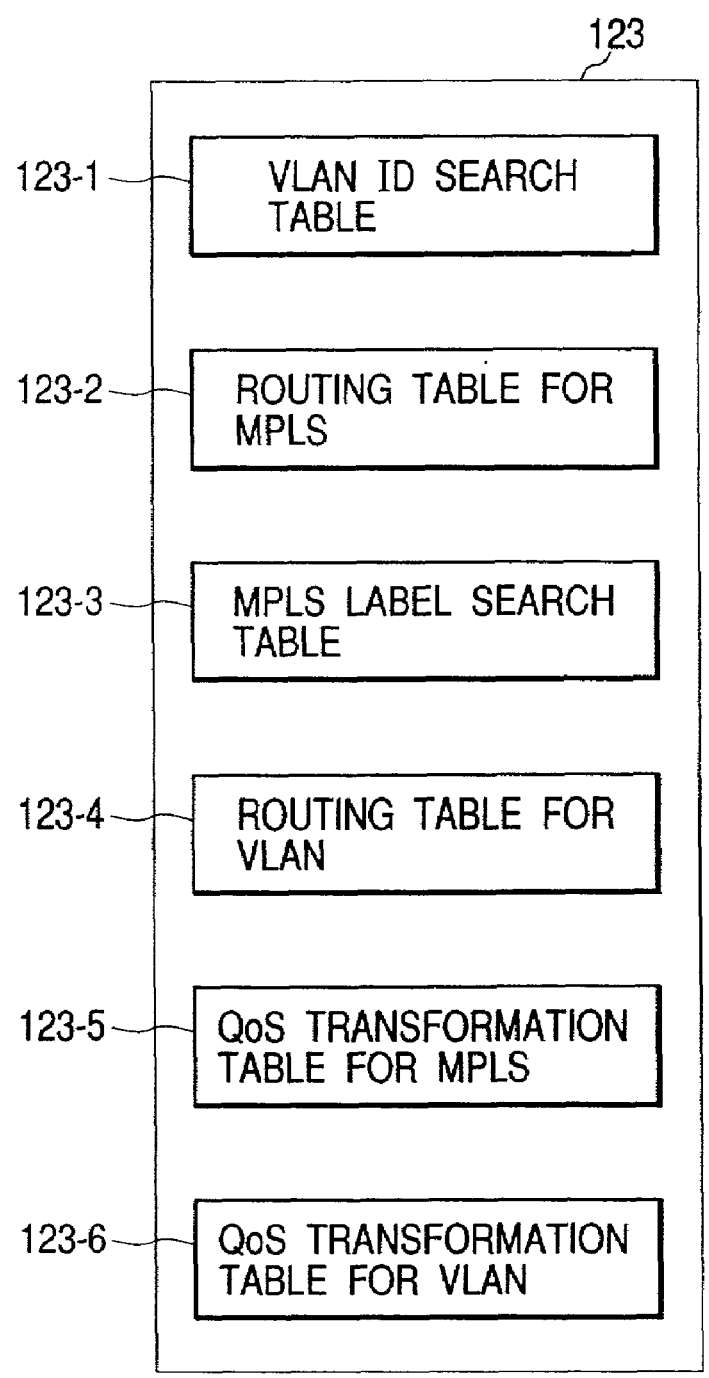
FIG. 12 is a diagram that shows a configuration example of the search table that is provided in network interworking devices of the present invention.

FIG. 12 shows a configuration example of the search table 123. The search table 123 consists of a VLAN ID search table 123-1, a route search table 123-2 for an MPLS output, an MPLS label search table 123-3, a route search table 123-4 for a VLAN output, a QoS transformation table 123-5 for an MPLS output and a QoS transformation table 123-6 for a VLAN output. These search tables are constructed in memory. It is not necessary that all the search tables are constructed in the same memory.

The VLAN ID search table 123-1 uses a VLAN ID as a search key and is the table for determining which VLAN it belongs to by searching it. The route search table 123-2 for an MPLS output is the table for determining an output label at the ingress node from the VLAN network to the MPLS network. The MPLS label search table 123-3 uses an MPLS label as a search key and is the table for determining which VLAN it belongs to. The route search table 123-4 for a VLAN output is the table for determining an output VLAN ID at the egress node from the MPLS network to the VLAN network. The QoS transformation table 123-5 for an MPLS output is the table for transforming a QoS value (user priority) of the VLAN network to a QoS value of the MPLS network. The QoS transformation table 123-6 for a VLAN output is the table for transforming a QoS value of the MPLS network to a QoS value (user priority) of the VLAN network.

Figure 11:
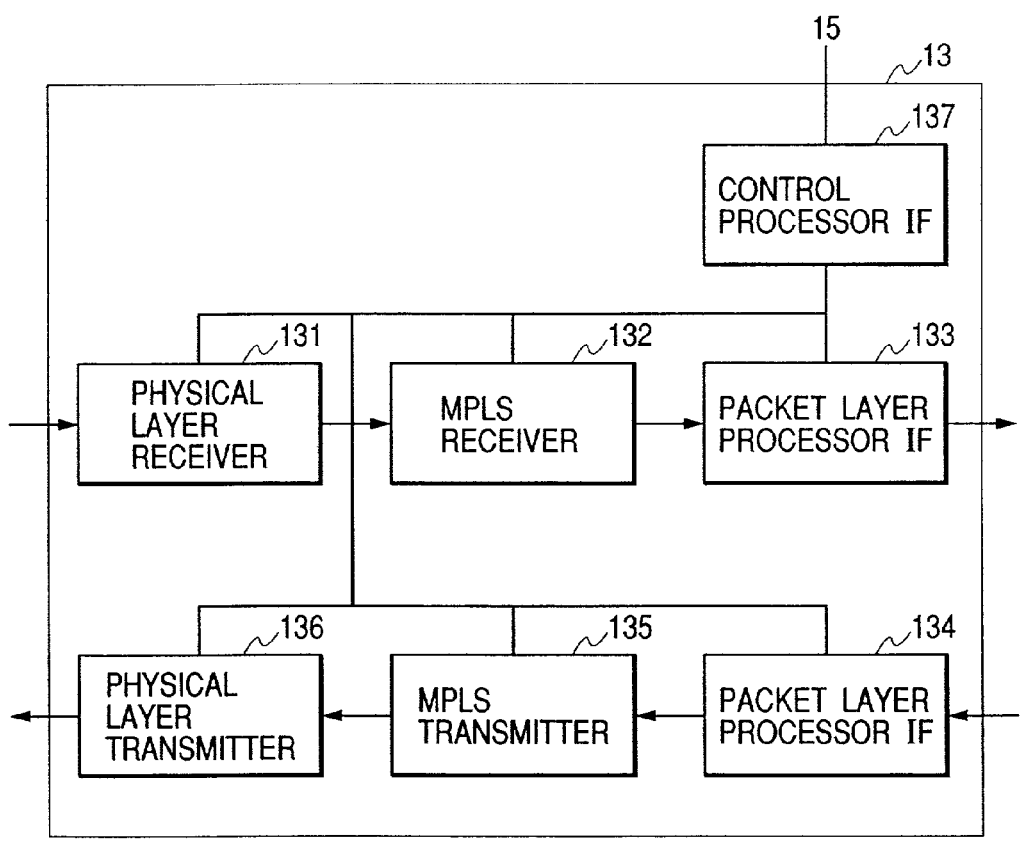
FIG. 11 is a diagram that shows a configuration example of the lower layer processor in network interworking devices of the present invention.

FIG. 11 shows the configuration of the lower layer processor for MPLS 13. The physical layer receiver 131 performs physical layer processing of a received packet. The MPLS receiver 132 performs termination processing of the data link layer and processing of extracting the MPLS header. The packet layer processor interfaces 133 and 134 are the interfaces with the packet layer processor 12. The MPLS transmitter 135 performs termination processing of the data link layer and processing of adding the MPLS header to the IP packet. The physical layer transmitter 136 transmits the packet to which the MPLS label has been added, through the physical circuit. The control processor interface 137 is the interface with the control processor 15 and connects with all the configuration elements of the lower layer processor 13.

The processing procedure by which network interworking device 1 associates a VLAN ID and an MPLS label is described.

The processing procedure by which network interworking device 1—1 in FIG. 1 obtains an output label from an input VLAN ID is described.

In network interworking device 1—1, the table search engine 122 searches the search table 123.

Figure 19:
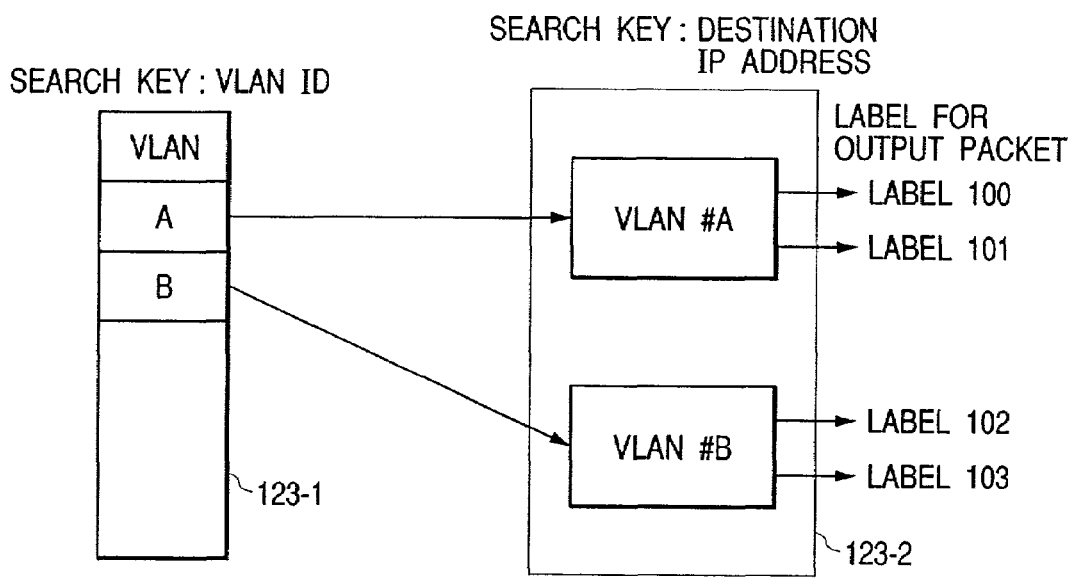
FIG. 19 is a diagram that shows the concept of the search procedure of the table search engine that is provided in network interworking devices of the present invention.

FIG. 19 shows the concept of the search procedure performed by the table search engine 122 in network interworking device 1—1. The table search engine 122 first searches the VLAN ID search table 123-1 and then searches the route search table 123-2 for an MPLS output.

Figure 13:
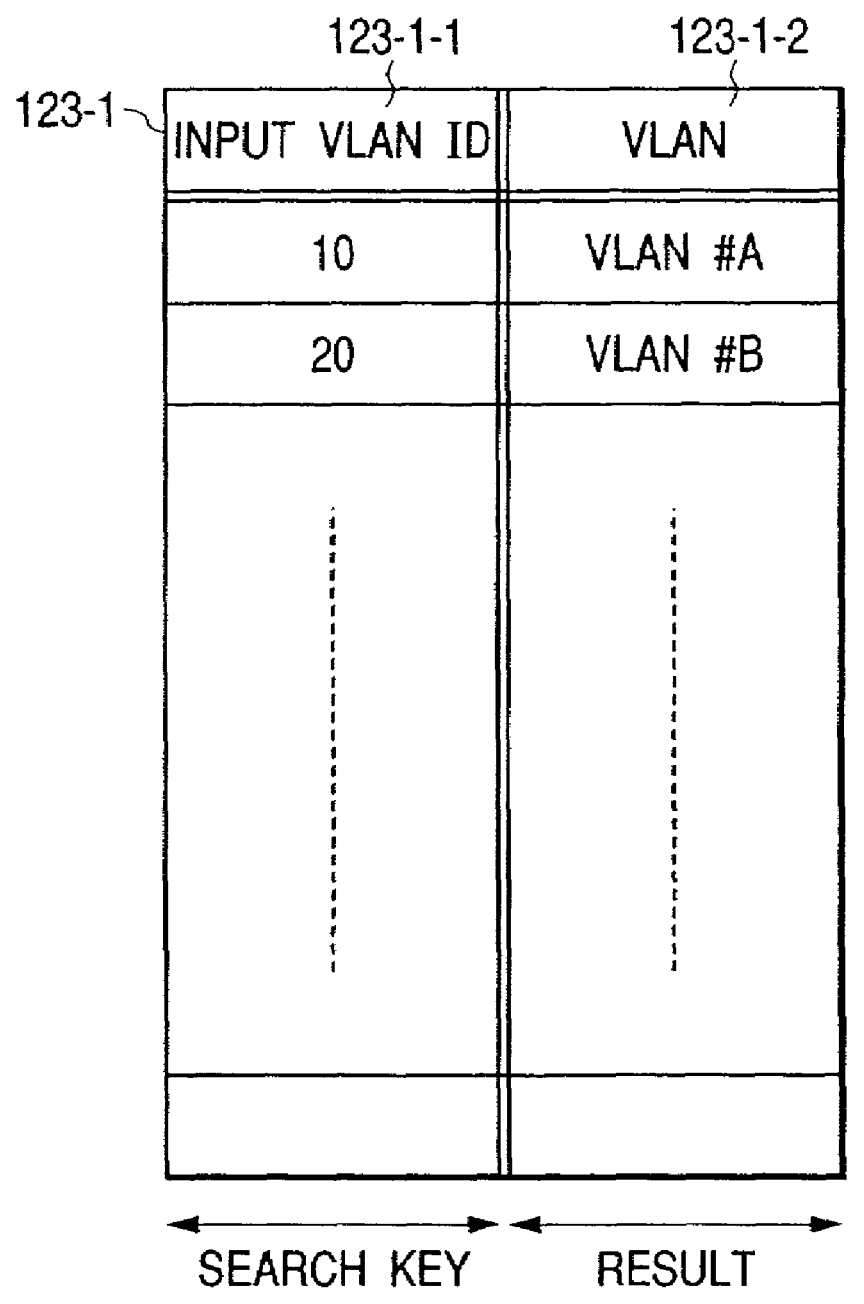

FIG. 13 shows a configuration example of the VLAN ID search table. In the VLAN ID search table 123-1, the input VLAN ID 123-1-1 is set as the search key, and the VLAN name 123-1-2 that corresponds to the VLAN ID is set as the search result. In the example shown in FIG. 13, when the VLAN ID search table 123-1 is searched with a value 10 as the input VLAN ID, the result is VLAN #A. A combination of the input VLAN ID and the input physical port of the packet can also be used as the search key. If a combination of the input VLAN ID and the input physical port of the packet is used as the search key, the same VLAN ID value can be used by different input physical ports in a configuration that contains multiple physical ports in the lower layer processor 11 shown in FIG. 8.

FIG. 14 shows a configuration example of the route search table for an MPLS output. In the route search table 123-2 for an MPLS output, the destination IP address 123-2-1 is set as the search key, and the output label 123-2-2 and the output physical port 123-2-3 are set as the search results. The entry of the route search table 123-2 for an MPLS output is divided for each VLAN. With the example shown in FIG. 14, the route search table 123-2 for an MPLS output is divided into the entry 123-2-*a* for VLAN #A and the entry 123-2-*b* for VLAN #B.

If the search result for the VLAN ID search table 123-1 is VLAN #A, the entry 123-2-*a* of the route search table 123-2 for an MPLS output is searched. For the example shown in FIG. 14, if the entry 123-2-*a* is searched with the destination IP address 192.168.10.0, the result becomes a value 100 for the output label and output physical port 3.

Next, the processing procedure in which network interworking device 1-2 in FIG. 1 obtains the output VLAN ID from the input label is described.

In network interworking device 1-2, the table search engine 122 searches the search table 123.

Figure 20:
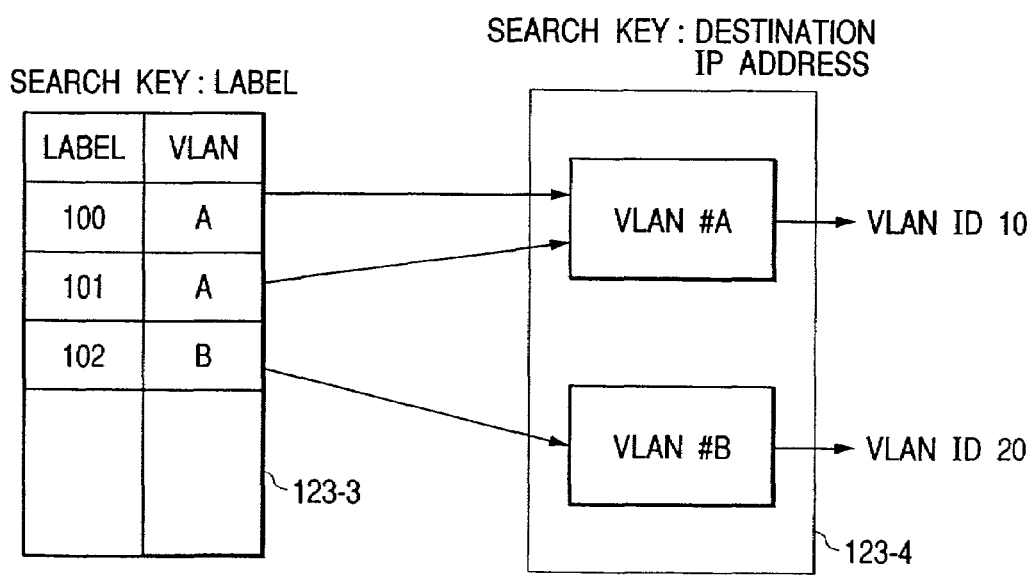
FIG. 20 is a diagram that shows the concept of the search procedure of the table search engine that is provided in network interworking devices of the present invention.

FIG. 20 shows the concept of the search procedure of the table search engine 122 in network interworking device 1-2. The table search engine 122 first searches the MPLS label search table 123-3 and then searches the route search table 123-4 for a VLAN output.

Figure 15:
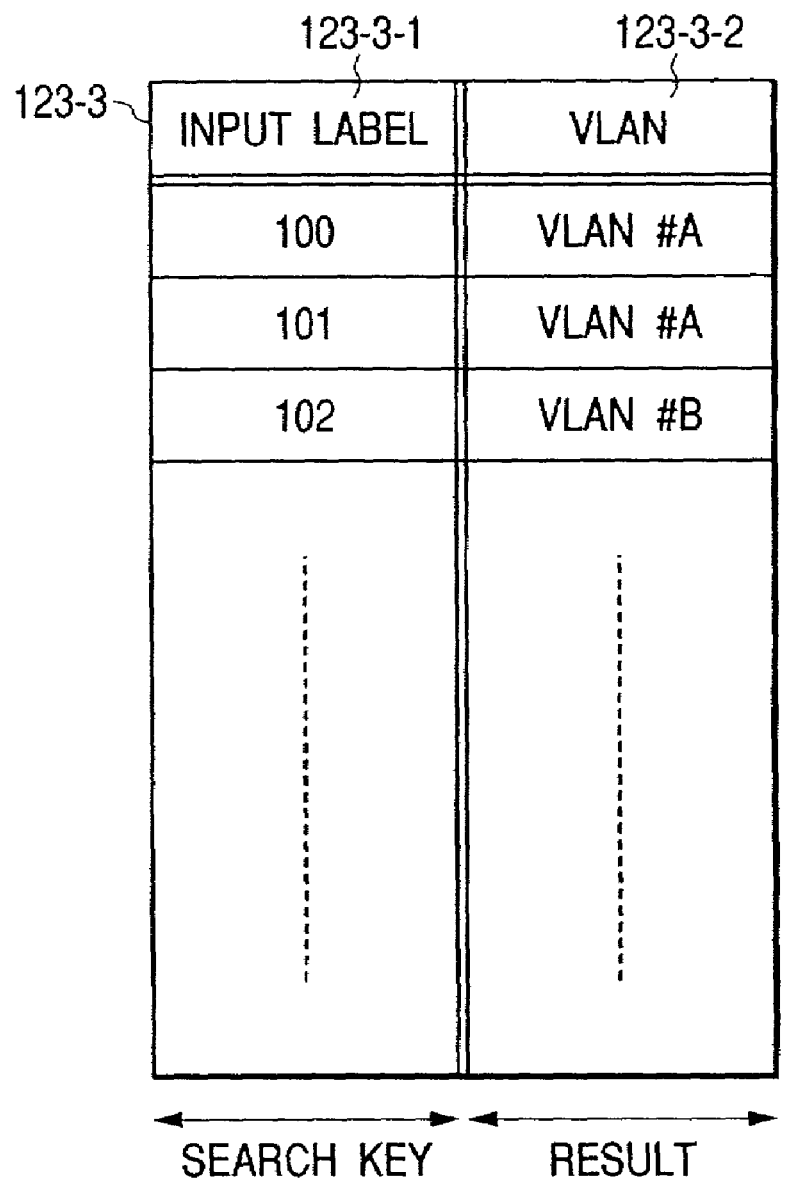

FIG. 15 shows a configuration example of the MPLS label search table 123-3. In 10 the MPLS label search table 123-3, the input label 123-3-1 is set as the search key, and a VLAN name that corresponds to an input label is set as the search result. In the example shown in FIG. 15, when the MPLS label search table 123-1 is searched with an input label value 101, the result is VLAN #A. A combination of an input label and an input physical port can also be used as the search key. If a combination of an input label and the input physical port of a packet is used as the search key, the same label value can be used by different input physical ports in a configuration that contains multiple physical ports in the lower layer processor 13 shown in FIG. 8.

FIG. 16 shows a configuration example of the route search table 123-4 for a VLAN output.

In the route search table 123-4 for a VLAN output, the destination IP address 123-4-1 is set as the search key, and the destination MAC address 123-4-2, the output VLAN ID 123-4-3 and the output physical port 123-4-4 are set as the search results. The entry of the search table 123-4 is divided for each VLAN. In FIG. 16, the route search table 123-4 for a VLAN output is divided into the entry 123-4-a for VLAN #A 25 and the entry 123-4-b for VLAN #B.

If the search result for the MPLS label search table 123-3 is VLAN #A, the table search engine searches the entry 123-4-a. If the entry 123-4-a is searched when the destination IP address is 192.168.10.0, the results become a value aa.bb.cc.dd.ee.ff for the output MAC address, a value 10 for the output VLAN ID, and output physical port 5.

Next, the processing procedure for realizing the end-to-end QoS control is described.

Figure 17:
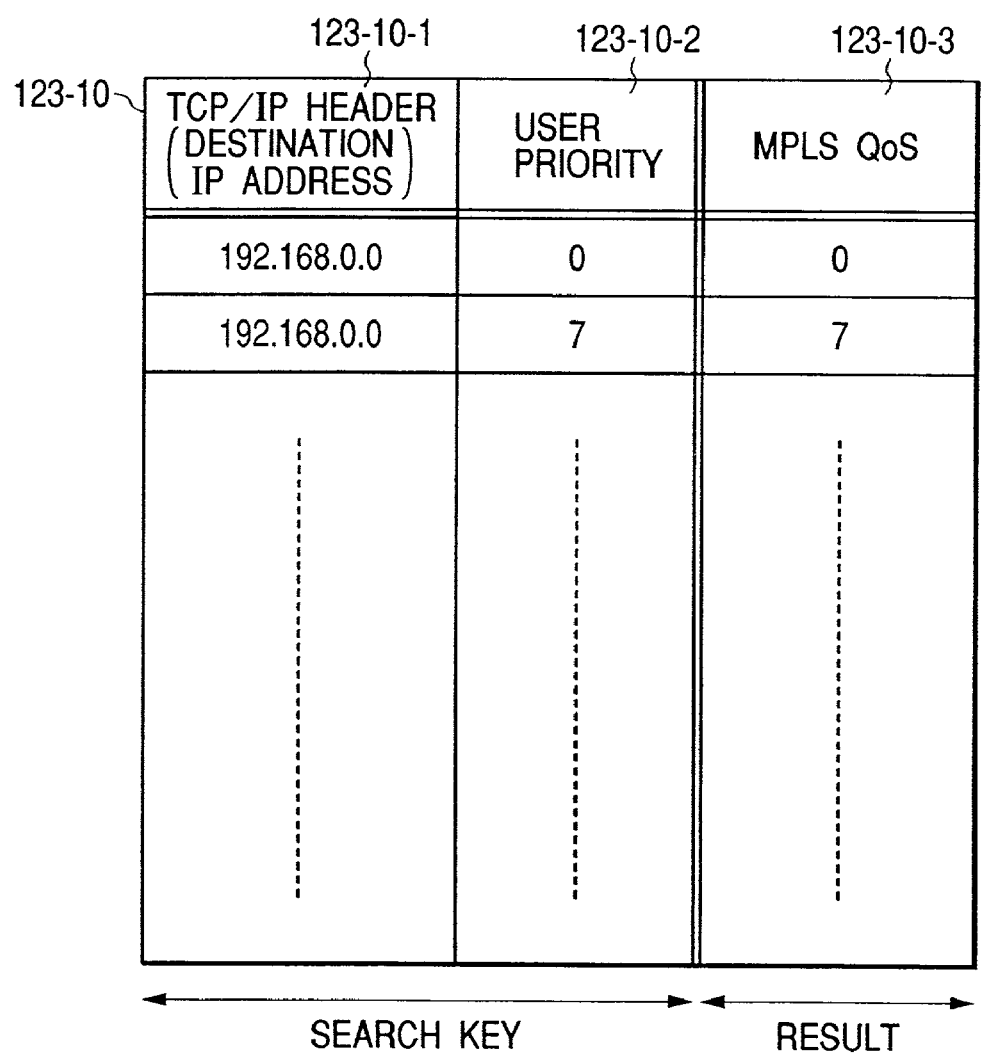
FIG. 17 is a diagram that shows a configuration example of the QoS transformation table for an MPLS output that is provided in network interworking devices of the present invention.

FIG. 17 shows a configuration example of the QoS transformation table 123-10 for an MPLS output for mapping the user priority stipulated by VLAN to the QoS information of the MPLS header in network interworking device 1—1.

In the QoS transformation table 123-10 for an MPLS output, the TCP/IP header information 123-10-1 and the user priority 123-10-2 are set as the search keys, and the QoS value 123-10-3 of the output MPLS header is set as the search result.

The table search engine 122 searches the QoS transformation table 123-10 for an MPLS output by using the TCP/IP header information and user priority added to the input packet as the search keys and obtains a QoS value to be set in the output MPLS header as the result. A destination IP address, type of service (TOS) value of the IP header and destination port number of the TCP header can be used as the TCP/IP header information 123-10-1. In the example shown in FIG. 17, the destination IP address is used as the TCP/IP header information 123-10-1. In PPP-based MPLS, the QoS information in the MPLS header can be associated with the Exp field, while in ATM-based MPLS, the QoS information can be associated with the CLP bit in the cell header.

Figure 18:
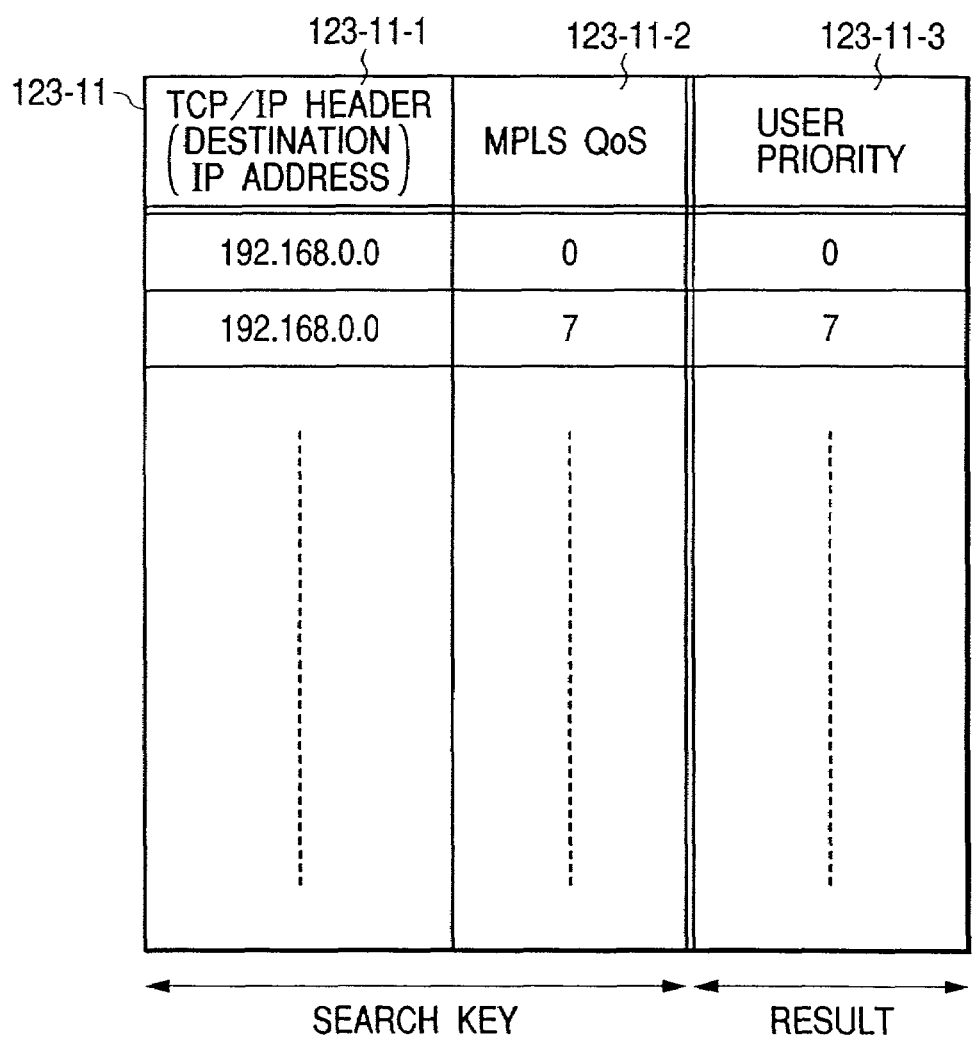
FIG. 18 a diagram that shows a configuration example of the QoS transformation table for a VLAN output that is provided in network interworking devices of the present invention.

FIG. 18 shows a configuration example of the QoS transformation table 123-11 for a VLAN output for mapping the QoS information in the MPLS header to the user priority in network interworking device 1-2.

In the table 123-11 for a VLAN output, the TCP/IP header information 123-11-1 and the input MPLS QoS value 123-11-2 are set as the search keys, and the user priority 123-11-3 is set as the search result.

The table search engine 122 searches the QoS transformation table 123-11 for a VLAN output by using the TCP/IP header information and output MPLS QoS value added to the input packet as the search keys and obtains an output user priority value as the result. A destination IP address and a TOS value in the IP header can be used as the TCP/IP header information 123-11-1. In the example shown in FIG. 18, the destination IP address is used as the TCP/IP header information 123-11-1. In PPP-based MPLS, the QoS information in the MPLS header can be associated with the Exp field, while in ATM-based MPLS, the QoS information can be associated with the CLP field in the cell header.

When the search of the QoS transformation table 123-10 for an MPLS output in network interworking device 1—1 is combined with the search of the QoS transformation table 123-11 for a VLAN output in network interworking device 1-2, a VLAN QoS value can be kept even in a network that uses an MPLS network to interwork VLAN networks that belong to the same group.

Because the user priority in the VLAN tag control information and the Exp bit in the shim header are both three bits, the same QoS value can be used in the VLAN and MPLS networks. Therefore, if the lower layer in an MPLS network is PPP, the TCP/IP header does not necessarily have to be set as the search key.

There are two methods for setting up the search table 123. One of them is performed manually by an administrator of network interworking device 1. The other is performed automatically by a device in a network which exchanges information autonomously.

An example in which an administrator of network interworking device 1 sets up the search table 123 manually is described.

When an administrator of network interworking device 1 sets up the search table 123 manually, the administrator determines values to be set to the search table 123 based on the operation policy of the network after understanding the network configuration. At this time, an operator of the VLAN network reports information necessary for connecting the VLAN networks located at physically separated places to the administrator of network interworking device 1. An example of that information is the IP address information of the devices to be connected. The administrator of network interworking device 1 sets up the search tables 123 by entering commands from the management system that is connected to the control processor 15 of network interworking device 1.

An example of automatic setup of the route search table 123-2 for an MPLS output is the method that uses a signaling protocol for label distribution. Label distribution protocols include the Label Distribution Protocol (LDP), which is defined in draft-ietf-mpls-ldp-06.txt of IETF, etc. When LDP is used, labels to be used through MPLS paths are assigned autonomously to the individual devices 1—1, 1-2 and 1-3 that configure MPLS network 5, by which these devices exchange messages with each other.

An example of automatic setup of the search table 123-4 for a VLAN output is the method that uses a routing protocol. The routing protocol operates between network interworking device 1-2 and the devices that configure LAN networks 7-1-3 and 7-1-4. As examples of the routing protocol, the Open Shortest Path First (OSPF), which is defined as RFC2178 of IETF, etc. are available. By using a routing protocol, network interworking device 1-2 can get the correspondence between the destination IP address 123-4-a and the output physical port 123-4-4, and the next hop IP address.

Furthermore, by using the Address Resolution Protocol (ARP), which is defined by RFC826 of IETF, network interworking device 1-2 can get the correspondence between the next hop IP address and the MAC address 123-4-2.

By the present invention, the information written in the header of the layer corresponding to layer 2 of the OSI model can be mapped to the MPLS header.

Furthermore, by the present invention, VLAN networks located at physically separated places can be interworked through an MPLS network, without impairing the isolation of those networks. Also the end-to-end QoS control can be performed at both ends of VLAN networks.

What is claimed is:

1. A packet transfer device that interworks an MPLS network which uses multiprotocol label switching (MPLS) network which uses a MPLS protocol, and a network that does not use said MPLS protocol, wherein:

in said MPLS network, packet switching is performed by the MPLS header which is added before a header of the layer corresponding to layer 3 of the Open System Interconnection (OSI) model, and in a network which does not use said MPLS protocol, packet switching is performed by a header of the layer corresponding to layer 2 of the OSI model, which is different from said MPLS header and is added before said layer 3 header, wherein said packet transfer device comprises:

a first physical port which receives a packet that is transmitted from the network which does not use said MPLS protocol, a second physical port for connecting with said MPLS network, a memory that stores header transformation information that shows correspondence between a pair of information in said layer 2 header and information in said layer 3 header in correspondance with information in said MPLS header, and a processor that searches said header transformation information and transforms said layer 2 header contained in a packet received from said first physical port to said MPLS header corresponding to said layer 2 header.

2. The packet transfer device recited in claim 1, wherein:

the information in said layer 2 header is the information that identifies the groups to which the transmission source and destination of a packet that is transmitted from a network which does not use said MPLS protocol belong; and the information in said MPLS header is the label value in said MPLS header.

3. The packet transfer device recited in claim 2, wherein:

a physical port number is assigned to said first physical port; and said header transformation information shows the correspondence between a group of said physical port number, the information that identifies the groups to which the transmission source and destination of a packet transmitted from a network which does not use said MPLS protocol belong and the information in said layer 3 header, and said label value.

4. The packet transfer device recited in claim 1, wherein:

said layer 2 header and said MPLS header each contain packet priority information;

a packet that is transferred in said MPLS network and a packet that is transferred in a network which does not use said MPLS protocol have, after said layer 3 header, the header of the layer that corresponds to layer 4 of the OSI model (hereinafter referred to as "layer 4 header"), wherein said device comprising:

memory that stores the priority transformation information that shows either the correspondence between a pair of said packet priority information in said layer 2 header and either the information in said layer 3 header or the information in said layer 4 header, and said priority information in said MPLS header; or the correspondence between a group of the packet priority information in said layer 2 header, the information in said layer 3 header and the information in said layer 4 header, and said priority information in said MPLS header, wherein said processor searches said priority transformation information and transforms said priority information in said layer 2 header contained in a packet received from said first physical port to said priority information in said MPLS header corresponding to it.

5. A packet transfer device that interworks an MPLS network which uses multiprotocol label switching (hereinafter referred to as "MPLS") and a network that does not use said MPLS protocol, wherein:

in said MPLS network, packet switching is performed by the MPLS header which is added before the header of the layer corresponding to layer 3 of the Open System Interconnection (OSI) model (hereinafter referred to as "layer 3 header"); and in a network which does not use said MPLS protocol, packet switching is performed by the header of the layer corresponding to layer 2 of the OSI model (hereinafter referred to as "layer 2 header"), which is different from said MPLS header and is added before the header of the layer corresponding to layer 3 of the OSI model (hereinafter referred to as "layer 3 header"), wherein said device comprising:

a first physical port which receives a packet that is transmitted from said MPLS network;

a second physical port for connecting with a network which does not use said MPLS protocol;

memory that stores the header transformation information that shows the correspondence between a pair of said MPLS header information and the information in said layer 3 header, and the information in said layer 2 header; and a processor that searches said header transformation information and transforms said layer 2 header contained in a packet received from said first physical port to said MFLS header corresponding to it.

6. The packet transfer device recited in claim 5, wherein:

the information in said MPLS header is the label value in said MPLS header; and the information in said layer 2 header is the information that identifies the groups to which the transmission source and destination of a packet that is transmitted from a network which does not use said MPLS protocol belong.

7. The packet transfer device recited in claim 6, wherein:

a physical port number is assigned to said first physical port; and said header transformation information shows the correspondence between a group of said physical port number, the value of said label and the information in said layer 3 header, and the information that identifies the groups to which the transmission source and destination of a packet transmitted from a network which does not use said MPLS protocol belong.

8. The packet transfer device recited in claim 5, wherein:
said layer 2 header and said MPLS header each contain packet priority information; and
a packet that is transferred in said MPLS network and a packet that is transferred in a network which does not use said MPLS protocol have, after said layer 3 header, the header of the layer corresponding to layer 4 of the OSI model (hereinafter referred to as "layer 4 header"),
wherein said device comprising:
memory that stores the priority transformation information that shows either the correspondence between a pair of said packet priority information in said MPLS header and either the information in said layer 3 header or the information in said layer 4 header, and said priority information in said layer 2 header; or the correspondence between a group of the packet priority information in said MPLS header, the information in said layer 3 header and the information in said layer 4 header, and said priority information in said layer 2 header,
wherein said processor searches said priority transformation information and transforms said priority information in said MPLS header contained in a packet received from said first physical port to said priority information in said layer 2 header corresponding to it.

9. The packet transfer device recited in claim 8, wherein:
said MPLS header is a shim header; and
the priority information used in said MPLS network is set to the 3-bit Exp field defined in said shim header.

10. The packet transfer device recited in claim 8, wherein:
said MPLS header is an ATM cell header; and
the priority information used in said MPLS network is set to the cell loss priority bit (CLP) field defined in said ATM cell header.

11. The packet transfer device recited in claim 6, wherein:
the tag control information field defined by IEEE 802.1Q is set in said layer 2 header; and
the information that identifies the groups to which the transmission source and destination of a packet transmitted from a network which does not use said MPLS protocol belong is the VLAN ID that is set in said tag control information field.

12. The packet transfer device recited in claim 6, wherein:
the tag control information field defined by IEEE 802.1Q is set in said layer 2 header; and
the packet priority information in said layer 2 header is the user priority that is set in said tag control information field.

13. A packet transfer control method in a packet transfer device that interworks an MPLS network which uses multiprotocol label switching (hereinafter referred to as "MPLS") and a network that does not use said MPLS protocol, wherein:
in said MPLS network, packet switching is performed by the label in the MPLS header which is added before the header of the layer corresponding to layer 3 of the Open System Interconnection (OSI) model (hereinafter referred to as "layer 3 header");
in a network which does not use said MPLS protocol, packet switching is performed by the header of the layer corresponding to layer 2 of the OSI model (hereinafter referred to as "layer 2 header"), which is different from said MPLS header and is added before said layer 3 header; and
a plurality of logical networks that are identified by the identifier in said layer 2 header are configured in the network which does not use said MPLS protocol,
wherein said method comprising the steps of:
setting the correspondence between said identifier and said label in said packet device;
determining to which network among said plurality of logical networks a received packet belongs, using said identifier in said layer 2 header that is added to the received packet, when the packet is received from the network which does not use said MPLS protocol;
checking said correspondence;
determining said label to be added to said received packet;
checking said correspondence when the packet is received from said MPLS network;
determining said identifier to be associated to said label added to said received packet in said MPLS network; and
determining to which network among said plurality of logical networks said received packet is to be transmitted from said MPLS network.

14. The packet transfer control method recited in claim 13, wherein:
said layer 2 header is a VLAN packet header defined by IEEE 802.1Q;
said identifier is the value that is set in the VLAN ID field; and
said layer 3 header is an Internet protocol (IP) header.

15. The packet transfer control method recited in claim 13, wherein:
said layer 2 header contains the priority information for the packet transfer in the network which does not use said MPLS protocol; and
said MPLS header contains the priority information for the packet transfer in said MPLS network,
wherein said method comprising the step of:
transforming said priority information in said layer 2 header to said priority information in said MPLS header.

16. The packet transfer control method recited in claim 15, wherein:
said layer 2 header is a VLAN packet header defined by IEEE 802.1Q;
said priority information in said layer 2 header is the value that is set in the user priority field;
said MPLS header is a shim header; and
the priority information in said MPLS header is the value of the 3-bit Exp field.

17. The packet transfer control method recited in claim 15, wherein:
said layer 2 header is a VLAN packet header defined by IEEE 802.1Q;
said priority information in said layer 2 header is the value that is set in the user priority field;
said MPLS header is an ATM cell header; and
the priority information in said MPLS header is the value of the cell loss priority bit (CLP) field.

18. The packet transfer control method recited in claim 16, wherein:
said layer 3 header is an Internet protocol (IP) header.

19. A setup method for a packet transfer device that interworks an MPLS network in which packet switching is performed by the multiprotocol label switching (hereinafter referred to as "MPLS") header and a network in which packet switching is performed by a VLAN packet header defined by IEEE 802.1Q, wherein:

said MPLS header possesses a label that is the connection identifier of said MPLS network, and the priority information for the packet transfer in said MPLS network, wherein said method comprising the steps of:

setting the correspondence between the value to be set to the VLAN ID field in said VLAN packet header and the label in said MPLS header; and setting the correspondence between the value to be set to the user priority field in said VLAN packet header and said priority information in said MPLS header.

* * * * *